(12) United States Patent
Arscott et al.

(10) Patent No.: US 8,601,301 B1
(45) Date of Patent: Dec. 3, 2013

(54) SYSTEM AND METHOD FOR ADJUSTING AN IDLE TIME OF A HARDWARE DEVICE BASED ON A PATTERN OF USER ACTIVITY THAT INDICATES A PERIOD OF TIME THAT THE USER IS NOT IN A PREDETERMINED AREA

(75) Inventors: Simon Arscott, San Francisco, CA (US); Ryan Tabone, San Francisco, CA (US)

(73) Assignee: Google Inc., Mountain View, CA (US)

(*) Notice: Subject to any disclaimer, the term of this patent is extended or adjusted under 35 U.S.C. 154(b) by 11 days.

(21) Appl. No.: 13/475,886

(22) Filed: May 18, 2012

(51) Int. Cl.
*G06F 1/26* (2006.01)
*G06F 1/32* (2006.01)

(52) U.S. Cl.
USPC .......................................................... 713/320

(58) Field of Classification Search
USPC .......................................................... 713/320
See application file for complete search history.

(56) References Cited

U.S. PATENT DOCUMENTS

| | | | |
|---|---|---|---|
| 5,913,067 A * | 6/1999 | Klein | 713/300 |
| 6,374,145 B1 | 4/2002 | Lignoul | |
| 7,010,710 B2 | 3/2006 | Piazza | |
| 7,647,515 B2 * | 1/2010 | Verdun | 713/320 |
| 8,145,931 B2 * | 3/2012 | Vojak et al. | 713/323 |
| 2003/0197597 A1 | 10/2003 | Bahl et al. | |
| 2007/0050654 A1 * | 3/2007 | Switzer et al. | 713/320 |
| 2007/0288777 A1 * | 12/2007 | Schutte | 713/320 |
| 2008/0111698 A1 | 5/2008 | Atherton | |
| 2010/0156790 A1 | 6/2010 | Su et al. | |
| 2011/0298722 A1 | 12/2011 | Tse et al. | |

* cited by examiner

*Primary Examiner* — Thomas Lee
*Assistant Examiner* — Xuxing Chen
(74) *Attorney, Agent, or Firm* — McDermott Will & Emery LLP

(57) ABSTRACT

A system and method is disclosed for adjusting power consumption of a computing device. The computing device is configured with one or more sensors to sense when a user moves away and returns to the computing device. Over a period of time, the computing device determines a pattern of activity related to how long the user is normally away from the computing device during particular times of the day. The computing device may then adjust power consumption of the device or associated components during times of the day for which a pattern of activity has been determined. For example, the computing device may adjust a duration that the computing device will remain idle before power to the computing device is limited.

14 Claims, 4 Drawing Sheets

SYSTEM AND METHOD FOR ADJUSTING AN IDLE TIME OF A HARDWARE DEVICE BASED ON A PATTERN OF USER ACTIVITY THAT INDICATES A PERIOD OF TIME THAT THE USER IS NOT IN A PREDETERMINED AREA

BACKGROUND

To save battery power, laptops and other computing devices may turn off an associated display screen and to into a suspended mode, or power down, after a predetermined amount of time being idle. However, just because a user is not interacting with a computing device does not mean that the device is "idle." For example, the user may merely be reading lengthy content of a document or webpage displayed on the device. In this case, turning off or lowering the brightness of the display screen may annoy the user. Alternatively, when the device is truly not being used, the device or components thereof may not need to be operating at full power.

SUMMARY

The subject technology provides a system and computer-implemented method for managing power consumption in a computing device. According to some aspects, a computer-implemented method may include providing a duration of time that the computing device will remain idle, for a predetermined period, before power to one or more components of the computing device is limited, sensing a user move away from and return to the computing device one or more times during the predetermined time period, determining an average length of time that the user is not proximate to the computing device during the predetermined time period, and adjusting, based on the average length of time, the duration that the computing device will remain idle, during the predetermined time period, before power to the one or more components is otherwise limited. Other aspects include corresponding systems, apparatus, and computer program products for implementation of the computer implemented method.

In other aspects, a machine-readable media may include instructions thereon that, when executed, perform a method. In this regard, the method may include receiving, from one or more sensors associated with a computing device, one or more sensing signals, determining, from the sensing signals, one or more periods of time that a user is not proximate to the computing device, and adjusting a power consumption associated with the hardware device based on the one or more periods of time. Other aspects include corresponding systems, apparatus, and computer program products for implementation of the computer implemented method.

A system may include a power regulator associated with a hardware device, one or more sensors configured to determine the presence of a user in a predetermined area, a processor, and a memory. The memory may include instructions thereon that, when executed by the processor, cause the processor to receive, from the one or more sensors, one or more presence signals, determine, from the presence signals, one or more periods of time that a user is not in the predetermined area, determine, from the periods of time, a pattern of user activity, and adjust the power consumption associated with the hardware device based on the pattern of user activity.

The previously described aspects and other aspects may provide one or more advantages, including, but not limited to, providing a mechanism to prevent unnecessarily limiting the power to a computing device, thereby decreasing the annoyance of a user having to interact with or restart the computing device, and to save power resources that would otherwise be expended during a restart of the device after an unnecessary shutdown, or from an anticipated subsequent extended absence of the user from the device.

It is understood that other configurations of the subject technology will become readily apparent from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

A detailed description will be made with reference to the accompanying drawings.

DETAILED DESCRIPTION

Figure 1:
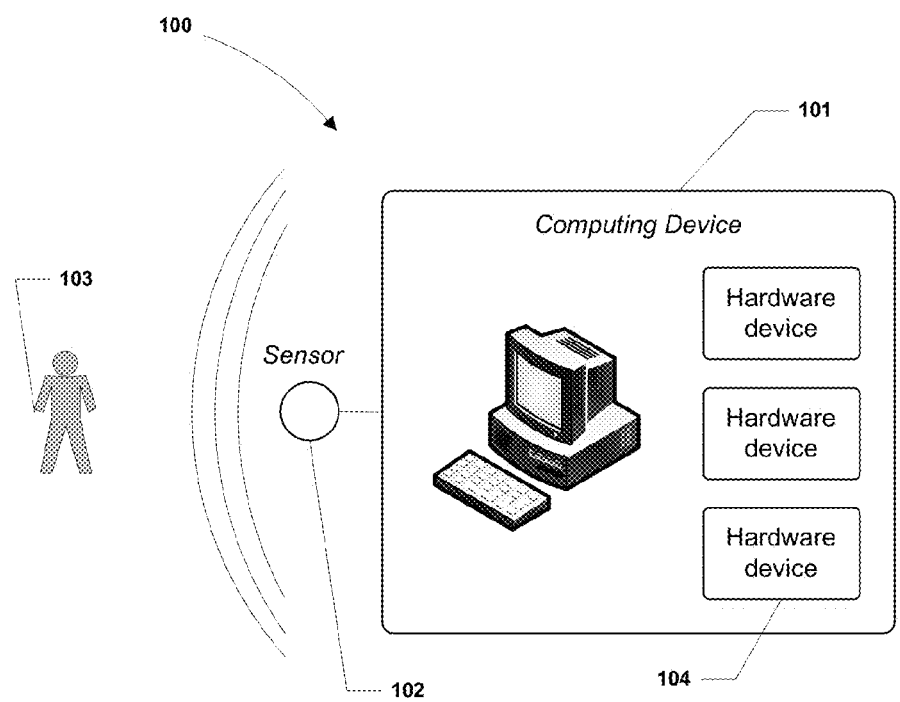
FIG. 1 is a diagram of example system for managing power consumption based on an anticipated interaction with a user.

FIG. 1 is a diagram of example system for managing power consumption based on an anticipated interaction with a user according to some aspects of the subject technology. A system 100 may include a computing device 101 (for example, a smart phone, tablet or notebook computer, personal computer, game console, PDA, a television or other display device with one or more computing devices embedded therein or attached thereto, or the like), operably connected to a sensor device 102. Sensor device 102 may generally refer to any device capable of sensing a user 103, including an integrated or connectable a proximity sensor, inductive sensor, pressure sensor, webcam, CCD camera, portable digital camera, camcorder, or the like. As will be described further with regard to FIG. 2, sensor device 102 may be configured to detect the presence of user 103, and a pattern of user activity based on the user presence over a period of time. In this manner, the determined pattern of activity may be used to anticipate an interaction between user 103 and computing device 101 (or a hardware device operably connected thereto), and to further determine whether computing device 101, or the associated hardware, is or should be in an idle state.

Computing device 101 may include several associated or integrated hardware devices 104, for example, a power supply, a display screen, optical media player (Blu-Ray, DVD, CD-ROM, or the like), WiFi or other network adapter, printer, webcam, and the like. Each of these hardware devices may be associated with a power consumption. The power consumption may include a rate of consumption or a power timeout period. For example, the power timeout period may be a time duration that computing device 101 or an associated hardware device may be idle before power to computing device 101 or the hardware device is limited (for example, suspended or powered down). For example, on computing device 101 being idle for an period of time greater than the power timeout period, computing device 101 may initiate a suspension or power down of the device's power supply, thereby shutting down other related systems of the device. Which hardware devices 104 are selected to be suspended or powered down may, in some aspects, depend on the anticipated user interaction, the time of day, and/or type of programs currently being executed by computing device 101. For example, if computing device 101 is playing audio files, and has been unattended for a period of time, the display screen or WiFi may be suspended on exceeding power timeout periods related to those components, but power to audio systems may be retained.

Figure 2:
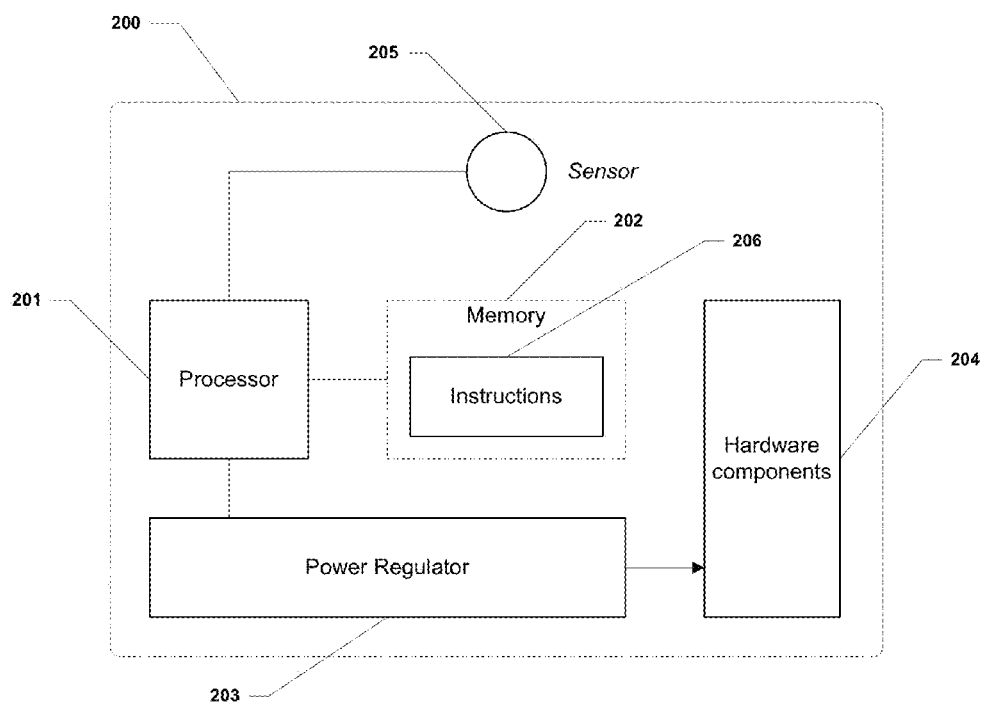
FIG. 2 is a diagram of example system for managing power consumption in a computing device.

FIG. 2 is a diagram of example system 200 for managing power consumption in a computing device according to some aspects of the subject technology. System 200 may include a processor 201, a memory unit 202, a power regulator 203, one or more hardware components 204, and one or more sensors 205 configured to determine the presence of a user. Power regulator 204 may be implemented as hardware or software. For example, power regulator 204 may be a power supply operably connected to hardware components 204 for proving power to hardware components 204, or may be software (for example, stored on memory unit 202) that, when executed by processor 201, adjusts (for example, regulates) power supplied to a power supply or other individual hardware components 204. In this regard, power regulator 204, memory unit 202, and/or a hardware power supply may be a single component or distributed across a group of components. In one example, power regulator 204 instructs a power supply (for example, as a hardware component 204) to supply a predetermined or adjusted amount of power to one or more hardware components 204.

One or more sensors 205 may be configured to determine the presence of a user (for example, user 103) proximate to a computing device associated with system 200. For example, a sensor 205 may include a proximity, inductive, or pressure sensor operably connected to the computing device. Accordingly, sensor 205 may be mounted on a chassis or bezel of a laptop or other computing device, or positioned near or around a keyboard. Sensor 205, when implemented as a proximity sensor, may determine when a user is within a predetermined area (including, for example, a location), or has moved away from and returned to the predetermined area. The predetermined area may include, for example, an area in front of or proximate to the computing device, or a predetermined distance away from the device. Sensor 205, when implemented as an inductive or pressure sensor, may determine when the user is touching or otherwise interacting with the computing device (for example, resting at least a portion of one or both of the user's hands on the keyboard or bezel of the device). In other aspects, sensor 205 may be camera circuitry operably connected to the computing device (for example, mounted on or connected to a display screen). In this regard, the camera circuitry may be configured to provide the one or more presence signals to processor 201 based on visual data collected from a viewing of the predetermined area. For example, the camera may use facial recognition techniques to identify the presence of the user. In some aspects, sensor 205 may further provide a signal when the user is present, and the length of time that the signal is absent may be recorded to determine how long the user normally spends away from the computer over the course of a day, or portions thereof.

Memory unit 202 may be implemented as a read-only memory (for example, ROM 403) or a system memory (for example, system memory 404). Memory unit 202 may include instructions 206 stored thereon that, when executed by processor 201, cause processor 201 to receive, from sensor 205, one or more presence signals (for example, a signal or data instructing processor 201 on whether a user has been detected), and determine, from the one or more presence signals, one or more periods of time that a user is not present (for example, not proximate to the device). Memory unit 202 may further include, stored thereon, a power consumption value, for example, a time duration that one or more associated hardware components 204 will remain idle before power regulator 203 is instructed to adjust (for example, limit) power consumption to the hardware components.

Periods of time that sensor 205 detects that a user is not presence may be recorded (for example, on memory 202) and analyzed to determine a pattern of user activity. The pattern of activity may include an average length of time that the user is not in a predetermined area during a predetermined time of the day. In one example, memory 202 may store activity data for certain portions of a day or a specific range of time (for example, hours, minutes, or the like) throughout the day. A different pattern of activity may also be associated with different ranges of time. In some aspects, the pattern of activity may be determined for a range of time periods over a number of days. For example, system 200 may determine that, for Monday through Friday, the user normally spends a first amount of time away from the computing device during the hours of 9:00 am and 12:00 pm, and 1:00 pm and 5:00 pm, and a second amount of time between the hours of 12:00 pm and 1:00 pm. A third amount of time may be spent away from the computing device on Saturdays and Sundays.

Once a pattern of user activity has been established (for example, after a predetermined number of periods in which the user moved away from the device), system 200 may adjust power consumption based on the pattern of user activity. In one example, a power timeout period may be increased (for example, extended) on the pattern showing that the user generally returns within a predetermined period of time after an expiration of the power timeout. In this manner, for a predetermined period of the day, if the user normally returns to the computer just after the currently set power timeout period expires, the system may automatically adjust the power timeout period so that the associated hardware component 204 is not suspended or powered-down before the user is expected to return on a subsequent absence of the user. Additionally or in the alternative, the power timeout period may be shortened on the pattern showing that the user generally returns after a predetermined period of time after an expiration of the power timeout. For example, if a current power timeout period is set at 15 minutes, and the user is always absent for more than a 30 minutes, the power timeout period may be shortened to 5 minutes to save power resources that would otherwise be expended during an expected subsequent extended absence of the user from the associated computing device. Similarly, the power timeout period may be shortened on the pattern showing that the user generally returns within a predetermined period of time before the expiration of the power timeout period.

In some aspects, the adjustment to the power timeout period may be incremental. For example, the power timeout period may be increased or decreased in 5 minute increments. In this regard, the adjustment may be implemented after a predetermined number of periods of time that the user was determined to be not present, a predetermined number of times the user was determined to be present, or after a predetermined period of time (for example, every 3 hours). Additionally or in the alternative, adjustments to other forms of power consumption may be implemented based on a determined pattern of user activity. For example, system 200 may adjust total power or a rate of power compensation, or the like.

In other aspects, system 200, on determining the presence of the user, may adjust power consumption based on current presence of the user. For example, system 200 may adjust (for example, increase) the power timeout period to delay a suspension of a hardware device that would otherwise be suspended for lack of user interaction with the device. In some aspects, if a user is detected, a power timeout period associated with one or more hardware components 204 may be disabled or extended. If no user is detected (for example, after a predetermined period of time), the power timeout period may be reduced or the associated hardware components immediately placed into a suspended mode or powered down. If the user is detected as moving away from the associated computing device, and system 100 does not detect the user return within a predetermined amount of time (for example, x seconds), system 100 may place the associated hardware components into the suspended mode or powered down. If a user is detected before a hardware component is suspended or powered down, the power timeout period may be reset or extended.

Figure 3:
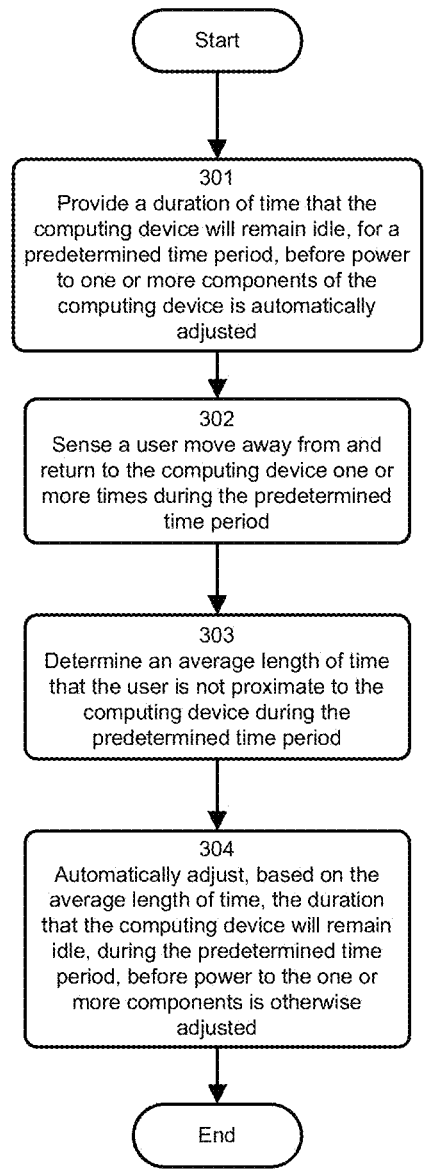
FIG. 3 is a flowchart illustrating an example process for managing power consumption in a computing device.

FIG. 3 is a flowchart illustrating an example process for managing power consumption in a computing device. According to some aspects, the process of FIG. 3 may be executed by the previously described system 200, and/or by the interaction of instructions 206 with system 200. In block 301, a duration of time is provided, the duration of time being a duration that the computing device will remain idle, for a predetermined time period (for example, during a day), before power to one or more components of the computing device is automatically adjusted (for example, limited). In block 302, one or more sensors sense that a user moved away from and returned to a computing device one or more times during the predetermined time period. As described previously, the one or more sensors may include proximity, inductive, or pressure sensors, or a camera, operably connected to the computing device.

In block 303, an average length of time that the user is not proximate to the computing device during the predetermined time period is determined. The average length of time may be based on one or more periods of time that a user is determined to be not proximate to the computing device by the one or more sensors. In block 304, the duration that the computing device will remain idle is automatically adjusted, based on the average length of time, before power to the one or more components is otherwise adjusted (for example, limited). In one example, if system 200 determines that the average length of time shows that the user normally begins using the computing device within a predetermined period of time after an expiration of the duration provided by block 301, then the duration may be increased. In this regard, the duration may be increased based on an average time that the user was not proximate to the computing device after the expiration of a power timeout up until the user began using the computing device.

In another example, if system 200 determines that the average length of time shows that the user normally begins using the computing device more a predetermined period of time after an expiration of the duration provided by block 301, then the duration may be decreased. Similarly, if system 200 determines that the average length of time shows that the user normally begins using the computing device more a predetermined period of time before the expiration of the duration provided by block 301, then the duration may be decreased. In this manner, power resources that would otherwise be expended while the user is away from the device for an extended amount of time may be saved. It is noted that, while the preceding example is based on an average length of time that the user is not proximate to the computing device, the previously described duration may be adjusted on other determined time periods. For example, the duration may be adjusted based on one or more selected periods of time in a group of times that the user was determined to be away from the device.

Figure 4:
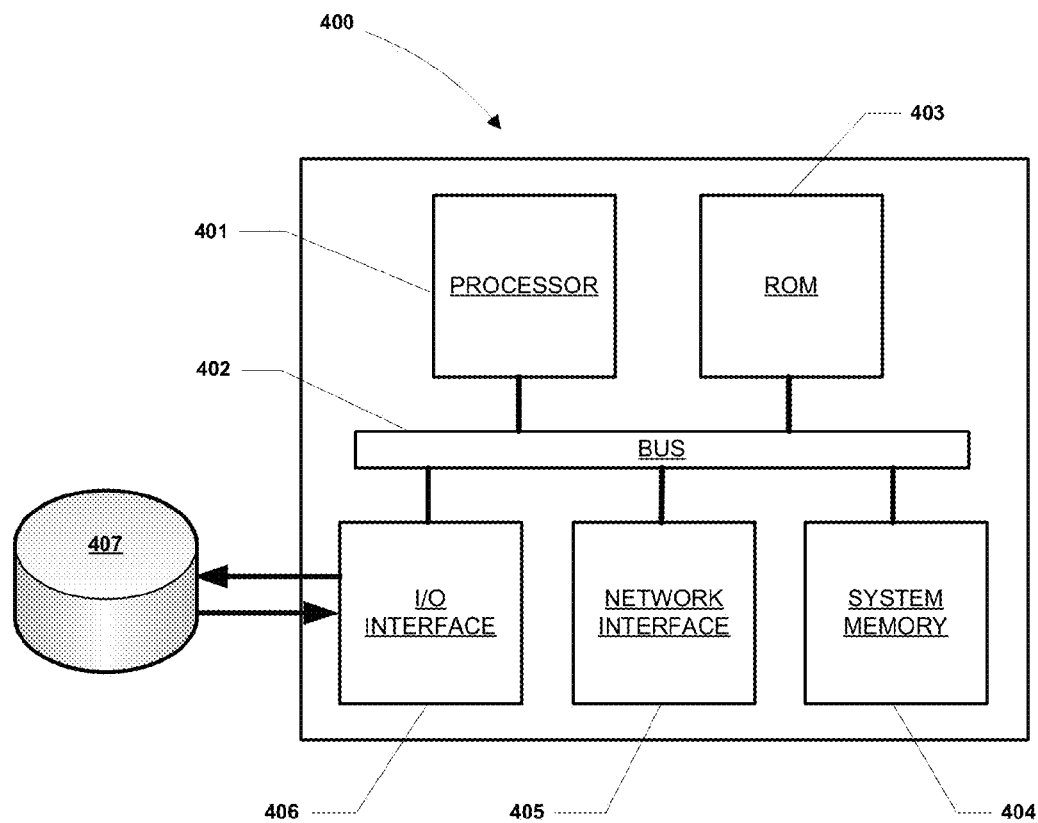
FIG. 4 is a diagram illustrating an example machine or computer that self-manages power consumption based on an anticipated interaction with a user.

FIG. 4 is a diagram illustrating an example machine or computer that self-manages power consumption based on an anticipated interaction with a user, including a processor and other internal components, according to some aspects of the subject technology. In some aspects, a computerized device 400 (for example, an embodiment of system 100 or system 200) includes several internal components, for example, a processor 401, a system bus 402, read-only memory 403, system memory 404, network interface 405, I/O interface 406, and the like. In some aspects, processor 401 may also be in communication with a storage medium 407 (for example, a hard drive, database, or data cloud) via I/O interface 406. In some aspects, all of these elements of device 400 may be integrated into a single device. In other aspects, these elements may be configured as separate components.

Processor 401 may be configured to execute code or instructions to perform the operations and functionality described herein, manage request flow and address mappings, and to perform calculations and generate commands. Processor 401 is configured to monitor and control the operation of the components in server 400. The processor may be a general-purpose microprocessor, a microcontroller, a digital signal processor (DSP), an application specific integrated circuit (ASIC), a field programmable gate array (FPGA), a programmable logic device (PLD), a controller, a state machine, gated logic, discrete hardware components, or a combination of the foregoing. One or more sequences of instructions may be stored as firmware on a ROM within processor 401. Likewise, one or more sequences of instructions may be software stored and read from system memory 405, ROM 403, or received from a storage medium 407 (for example, via I/O interface 406). ROM 403, system memory 405, and storage medium 407 represent examples of machine or computer readable media (for example, non-transitory media) on which instructions/code may be executable by processor 401. Machine or computer readable media may generally refer to any medium or media used to provide instructions to processor 401, including both volatile media, for example, dynamic memory used for system memory 404 or for buffers within processor 401, and non-volatile media, for example, electronic media, optical media, and magnetic media. The features and/or functionality of ROM 403, system memory 405, and storage medium 407 may be implemented as a single component or distributed among a group of components. Moreover, ROM 403, system memory 405, and/or storage medium 407 may include the same or similar features and/or functionality of previously described memory unit 202, and vice versa. Accordingly, ROM 403, system memory 405, and storage medium 407, and memory unit 202, as used herein, may be interchangeable for the purposes of describing the features and/or functionality of the subject technology.

In some aspects, processor 401 is configured to communicate with one or more external devices (for example, via I/O interface 406). Processor 401 is further configured to read data stored in system memory 404 or storage medium 407 and to transfer the read data to the one or more external devices in response to a request from the one or more external devices. The read data may include one or more web pages or other software presentation to be rendered on the one or more external devices. The one or more external devices may include a computing system, for example, a personal computer, a server, a workstation, a laptop computer, PDA, smart phone, and the like.

In some aspects, system memory 404 represents volatile memory used to temporarily store data and information used to manage device 400. According to some aspects of the subject technology, system memory 404 is random access memory (RAM), for example, double data rate (DDR) RAM. Other types of RAM also may be used to implement system memory 404. Memory 404 may be implemented using a single RAM module or multiple RAM modules. While system memory 404 is depicted as being part of device 400, it will be recognized that system memory 404 may be separate from device 400 without departing from the scope of the subject technology. Alternatively, system memory 404 may be a non-volatile memory, for example, a magnetic disk, flash memory, peripheral SSD, and the like.

I/O interface 406 may be configured to be coupled to one or more external devices, to receive data from the one or more external devices and to send data to the one or more external devices. I/O interface 406 may include both electrical and physical connections for operably coupling I/O interface 406 to processor 401, for example, via the bus 402. I/O interface 406 is configured to communicate data, addresses, and control signals between the internal components attached to bus 402 (for example, processor 401) and one or more external devices (for example, a hard drive). I/O interface 406 may be configured to implement a standard interface, for example, Serial-Attached SCSI (SAS), Fiber Channel interface, PCI Express (PCIe), SATA, USB, and the like. I/O interface 406 may be configured to implement only one interface. Alternatively, I/O interface 406 may be configured to implement multiple interfaces, which are individually selectable using a configuration parameter selected by a user or programmed at the time of assembly. I/O interface 406 may include one or more buffers for buffering transmissions between one or more external devices and bus 402 or the internal devices operably attached thereto.

Various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description provides various examples of the subject technology, and the subject technology is not limited to these examples. Various modifications to these aspects will be readily apparent, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the disclosure.

The term website, as used herein, may include any aspect of a website, including one or more web pages, one or more servers used to host or store web related content, and the like. Accordingly, the term website may be used interchangeably with the terms web page and server. The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

The word "exemplary" is used herein to mean "serving as an example or illustration." Any aspect or design described herein as "exemplary" is not necessarily to be construed as preferred or advantageous over other aspects or designs.

What is claimed is:

1. A system, comprising:
   a power regulator associated with a hardware device;
   one or more sensors configured to determine the presence of a user in a predetermined area proximate to the hardware device;
   a processor; and
   a memory having instructions thereon that, when executed by the processor, cause the processor to:
   receive, from the one or more sensors, one or more presence signals;
   determine, from the presence signals, one or more periods of time that a user moved away from the predetermined area without the user physically interacting with the system;
   determine, from the periods of time, a pattern of user activity comprising an average length of time that the user is not in the predetermined area during a predetermined time period over a predetermined number of days;
   adjust a power consumption associated with the hardware device based on the pattern of user activity,
   wherein determining the pattern of user activity comprises, for the periods of time, determining that the user returned to within the predetermined area without the user physically interacting with the system, the user returning more than a predetermined period of time before an expiration of a time duration that the hardware device will remain idle before the power regulator is instructed to limit power to the hardware device, or more than a predetermined period of time after the expiration of the time duration, and wherein the power consumption is adjusted by decreasing the time duration based on a period of time that the user was not in the predetermined area.

2. The system of claim 1, wherein the predetermined area comprises an area proximate to the hardware device.

3. The system of claim 1, wherein the instructions, when executed, further cause the processor to:

determine that the user returned to the predetermined area within a predetermined period of time after the expiration of the time duration; and increase the time duration based on a period of time that the user was not in the predetermined area.

4. The system of claim 1, wherein the instructions, when executed, further cause the processor to:

determine, from the signals, the presence of a user in the predetermined area before the expiration of the time duration; and delay, on determining the presence of the user, a suspension of the hardware device.

5. The system of claim 1, wherein the one or more sensors comprises one or more proximity sensors.

6. The system of claim 1, wherein the one or more sensors comprises camera circuitry operably connected to the hardware device, the camera circuitry configured to provide the one or more presence signals based on visual data collected from a viewing of the predetermined area.

7. The system of claim 1, wherein determining one or more periods of time that a user moved away from the predetermined area comprises determining that the user moved a predetermined distance away from the system.

8. A non-transitory machine-readable media including instructions thereon that, when executed, perform a method, the method comprising:

receiving, from one or more sensors associated with a computing device, one or more sensing signals;

determining, from the sensing signals, one or more periods of time that a user moved away from a predetermined area proximate the computing device without the user physically interacting with the system;

determining, based on the one or more periods of time, a pattern of activity comprising an average length of time that the user moved away from the predetermined area without the user physically interacting with the computing device, determining the pattern of activity comprising determining that the user returned to within the predetermined area without the user physically interacting with the computing device, the user returning more than a predetermined period of time before an expiration of a time duration that the computing device will remain idle before power to the computing device is limited, or more than a predetermined period of time after the expiration of the time duration; and decreasing the time duration based on a period of time that the user was not in the predetermined area.

9. The non-transitory machine-readable media of claim 8, further comprising:

determining that the user was not proximate to the computing device after the expiration of the time duration; and increasing the time duration based on an average time that the user was not proximate to the computing device after the expiration of the time duration up until the user began using the computing device.

10. The non-transitory machine-readable media of claim 8, the method further comprising:

determining, from the sensing signals, a current presence of the user before the expiration of the time duration; and delaying, on determining the presence of the user, a power down of the computing device.

11. The non-transitory machine-readable media of claim 8, wherein the one or more sensors comprises one or more proximity, inductive, or pressure sensors operably connected to the computing device.

12. The non-transitory machine-readable media of claim 8, wherein determining one or more periods of time that a user moved away from the predetermined area comprises determining that the user moved a predetermined distance away from the computing device.

13. A computer-implemented method for managing power consumption in a computing device, comprising:

providing, for a predetermined time period, a predetermined duration of time that the computing device will remain idle before power to one or more components of the computing device is automatically limited;

sensing a user move away from and return to a predetermined area proximate the computing device one or more times during the predetermined time period without the user physically interacting with the computing device;

determining, based on the sensing, a pattern of activity comprising an average length of time that the user moved away from the predetermined area during the predetermined time period for a number of days, determining the pattern of activity comprising determining that the user returned to the predetermined area more than a predetermined period of time before a current time limit for limiting power to the one or more components, or more than a predetermined period of time after the current time limit; and automatically adjusting, based on the pattern of activity, the predetermined duration of time.

14. The method of claim 13, sensing the user move away from and return to the predetermined area proximate the computing device comprises sensing the user move a predetermined distance away from the computing device.

* * * * *